Feb. 10, 1931.  G. K. JESSUP  1,791,624
BLOWING SOAPSTONE INTO DUCTS
Filed July 21, 1927
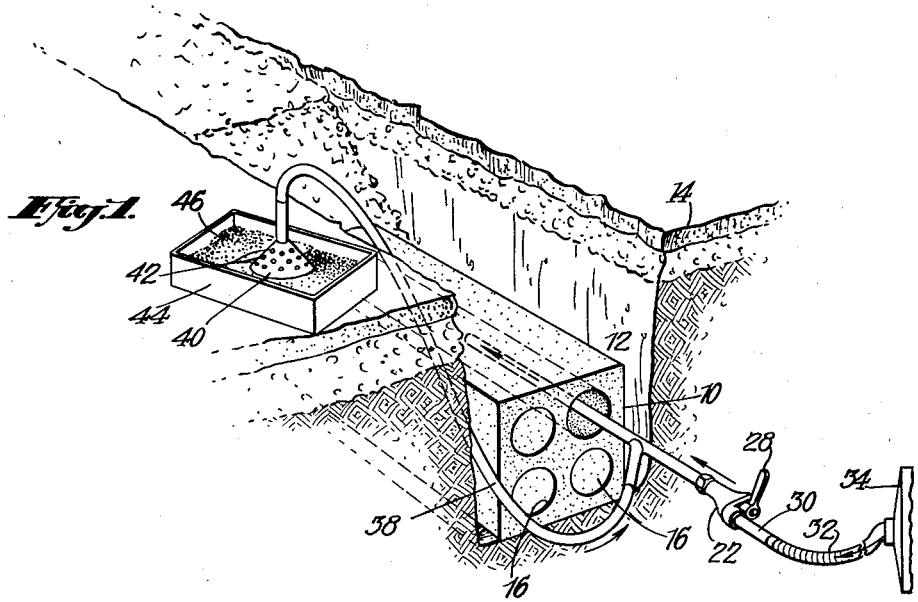
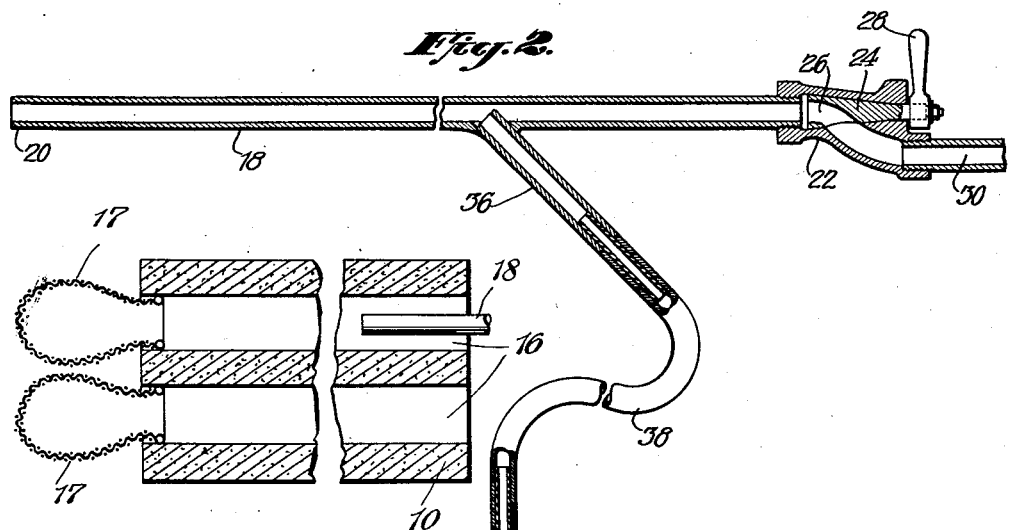
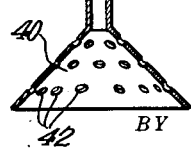
INVENTOR
George K. Jessup
BY
ATTORNEY Patented Feb. 10, 1931

1,791,624

UNITED STATES PATENT OFFICE

GEORGE K. JESSUP, OF GREENWICH, CONNECTICUT, ASSIGNOR, BY MESNE ASSIGNMENTS, TO METROPOLITAN DEVICE CORPORATION, A CORPORATION OF NEW YORK

BLOWING SOAPSTONE INTO DUCTS

Application filed July 21, 1927. Serial No. 207,369.

This invention relates to the method of and means for applying a powdery substance to the walls of ducts.

While not limited thereto the invention is particularly well suited for applying a lubricant such as soapstone to the walls of concrete ducts such as frequently used to enclose electric cables.

The invention will be apparent from the following specification when read in connection with the accompanying drawings in which—

Fig. 1 illustrates the method of blowing soapstone through a duct of cast concrete;

Fig. 2 is a sectional detail of an improved device embodying the invention.

Fig. 3 is a detail view illustrating means for restricting the outlets of the ducts.

Referring in detail to the drawings, 10 represents a body of concrete which is formed in situ in a trench 12 which is subsequently filled in and covered usually with earth and crushed stone and a suitable top covering 14 or pavement when the concrete body is located below the surface of a street or roadway.

The body 10 is cast or formed with a plurality of ducts 16 in which electric cables are adapted to be located. The ducts 16 are frequently from 200 feet to 500 feet in length extending from manholes located at or near street intersections.

The cables or electric conductors are usually encased in a sheath of less diameter than the ducts.

To overcome or minimize friction between the cable and the wall of the ducts so as to facilitate pulling or "fishing" the cable through the ducts, it has heretofore been the practice to lubricate the duct or the cable or both but the prior method and apparatus employed have been cumbersome, costly and some have been inefficient.

By my method I quickly, effectively and cheaply lubricate ducts of great length by blowing or forcing therethrough by means of compressed air or other suitable fluid medium, a cloud-like spray of a powdery lubricant such as pulverized soapstone or the like. The soapstone or other lubricant can be forced through the duct either before or after the same has dried. It is somewhat advantageous to blow in the lubricant while the concrete is still "green" or somewhat moist as the powdery particles readily adhere to green cement or concrete. However, the method can be effectively operated in dry ducts as well for when the air or other pressure is shut off, all the soapstone or other lubricant throughout the length of the duct will drop in place.

To prevent excessive loss of the powdery lubricant, canvas bags 17 or other somewhat porous stoppers may be employed at the end of the duct remote from that end at which the lubricant is introduced.

For blowing the soapstone or lubricant into the duct, I preferably employ a gun such as illustrated in Fig. 2 which I have designed for carrying out my improved method.

The gun includes a pipe-like nozzle 18 having an open end 20 and having a valve body 22 secured to the opposite end. A valve plug 24 within said body has a port 26 which can be turned by the operating handle 28 so as to control the supply of air or other fluid pressure delivered to the pipe-like nozzle 18 by the pipe 30 which is connected by means of flexible air hose 32 with a suitable compressed air tank or receiver 34.

An angular branch pipe 36 is connected with the nozzle 18 and said branch is connected by a flexible hose 38 to a hollow conical shell or intake 40 having a series of perforations 42 formed therein. The intake shell 40 is adapted to be placed in a box 44 containing a supply of pulverized soapstone or the like as indicated at 46.

In operation when the valve plug 24 is turned to bring the port 26 therein to the position of Fig. 2, the air from the tank 34 will cause the soapstone 46 to be drawn through the intake 40 and conveyed by hose 38 and branch 36 to the nozzle 18, the end of which will be located within the conduit. Thus the soapstone will be blown throughout the entire length of the duct. Such soapstone will adhere to the wall of the duct when the concrete is green or it will fall into place in a dry duct as soon as the air pressure is shut off.

The maintenance of the current of air throughout the length of the duct may be assisted by exerting a suction on the opposite end of the duct; or the air current may be effected entirely by suction instead of blowing.

Various modifications may be made by those skilled in the art without departing from the invention as defined in the appended claims.

What I claim is:—

1. The method of lubricating a duct of cementitious material of great length which consists in blowing a cloud of powdery lubricant therethrough, and restricting the outflow of lubricant at the exit end of the duct.

2. The method of lubricating a concrete cable duct which consists in passing therethrough a cloud of powdery particles of soapstone held in suspension by a current of air while the wall of the duct is moist so that the powdery soapstone will readily adhere thereto.

3. The method of lubricating an electric cable duct to facilitate the introduction of the cable, which consists in introducing a powdery lubricant in a current of air and restricting the outflow of lubricant at the exit end of the duct.

4. The method of lubricating an electric cable duct to facilitate the introduction of the cable, which consists in introducing a powdery lubricant in a current of air while the wall of the duct is moist so that the lubricant will adhere thereto and restricting the outflow of the air current at the exit end of the duct.

5. The method of coating cable conduit with a lubricant which consists in depositing a lubricant in powdered form upon the interior of the conduit while the material which forms a part of the conduit is in a moist condition to cause adherence of said coating to said conduit.

6. The method of lubricating a cable duct which consists in passing therethrough a cloud of powdery particles of soapstone held in suspension by a current of air while the wall of the duct is moist so that the powdery soapstone will readily adhere thereto.

In witness whereof, I have hereunto signed my name.

GEORGE K. JESSUP.